United States Patent
Matic et al.

(10) Patent No.: US 12,356,285 B2
(45) Date of Patent: Jul. 8, 2025

(54) INFERRING THE IMPACT ON A USER'S WELL-BEING OF BEING IN A CERTAIN LOCATION OR SITUATION OR WITH CERTAIN INDIVIDUALS

(71) Applicant: KOA HEALTH DIGITAL SOLUTIONS S.L.U., Barcelona (ES)

(72) Inventors: Aleksandar Matic, Lloret de Mar (ES); Johan Lantz, Barcelona (ES)

(73) Assignee: KOA HEALTH DIGITAL SOLUTIONS S.L.U., Barcelona (ES)

( * ) Notice: Subject to any disclaimer, the term of this patent is extended or adjusted under 35 U.S.C. 154(b) by 345 days.

(21) Appl. No.: 17/323,965

(22) Filed: May 18, 2021

(65) Prior Publication Data

US 2021/0274318 A1    Sep. 2, 2021

Related U.S. Application Data

(63) Continuation-in-part of application No. PCT/EP2019/081704, filed on Nov. 19, 2019.

(30) Foreign Application Priority Data

Nov. 21, 2018  (EP) .................................. 18382837

(51) Int. Cl.
*H04W 4/029*    (2018.01)
(52) U.S. Cl.
CPC .................................. *H04W 4/029* (2018.02)
(58) Field of Classification Search
CPC ............ H04W 4/029; H04N 21/44218; H04N 21/44227; H04N 21/4524; H04N 21/42201
See application file for complete search history.

(56) References Cited

U.S. PATENT DOCUMENTS 7,261,690 B2   8/2007   Teller et al. ............. A61B 5/00
                                                    600/300
7,285,090 B2  10/2007   Stivoric et al. ........ A61B 5/00
                                                    600/300
(Continued)

FOREIGN PATENT DOCUMENTS

CA    3090916 A1 *   8/2019  ................ A61B 5/01
CA    3024882 C  *   3/2021  ............ A61B 5/0022
(Continued)

OTHER PUBLICATIONS

P. Carmona, D. Nunes, D. Raposo, D. Silva, J. S. Silva and C. Herrera, "Happy hour—improving mood with an emotionally aware application," 2015 15th International Conference on Innovations for Community Services (14CS), Nuremberg, Germany, 2015, pp. 1-7, doi: 10.1109/14CS.2015.7294480. (Year: 2015).*

(Continued)

*Primary Examiner* — Yuwen Pan
*Assistant Examiner* — Swati Jain
(74) *Attorney, Agent, or Firm* — MARSHALL, GERSTEIN & BORUN LLP

(57) ABSTRACT

An electronic device includes a context scanner, an emotion feedback module, and a processing unit. The context scanner scans an area during a predetermined time period to detect position and proximity information of the electronic device of a user. The position information indicates the geographic location of the electronic device within the area. The proximity information indicates that the electronic device is in the proximity of a second electronic device of a second user. The emotion feedback module detects the user's emotional response during the time period by sensing physiological and physical signals of the user. The processing unit executes an algorithm that determines the relationship between the position information, the proximity information and the emotional response. The processing unit generates a (Continued)

report based on the relationship. The report indicates how the user's presence in the geographic location and the user's proximity to the second user influence the user's well-being.

18 Claims, 4 Drawing Sheets

(56) References Cited

U.S. PATENT DOCUMENTS

| | | | | |
|---|---|---|---|---|
| 7,914,468 | B2* | 3/2011 | Shalon | A61B 5/0006 |
| | | | | 600/595 |
| 7,914,468 | B2 | 3/2011 | Shalon et al. | A61B 5/103 |
| | | | | 600/590 |
| 7,967,731 | B2* | 6/2011 | Kil | G16H 20/30 |
| | | | | 482/901 |
| 9,165,117 | B2* | 10/2015 | Teller | G16H 20/60 |
| 9,692,839 | B2* | 6/2017 | Davis | A61B 5/0022 |
| 10,314,550 | B2* | 6/2019 | Frieder | A61B 5/7267 |
| 10,960,173 | B2* | 3/2021 | Biradar | G06V 40/174 |
| 11,070,767 | B1* | 7/2021 | Brown, Jr. | H04M 1/725 |
| 11,324,426 | B1* | 5/2022 | Winslow | G06F 18/2415 |
| 11,710,323 | B2* | 7/2023 | Chang | G06V 40/176 |
| 11,839,473 | B2* | 12/2023 | Flickinger | A61B 5/7282 |
| 2007/0185391 | A1* | 8/2007 | Morgan | A61B 5/0002 |
| | | | | 128/920 |
| 2010/0028841 | A1* | 2/2010 | Eatough | G09B 5/065 |
| | | | | 434/362 |
| 2013/0216989 | A1* | 8/2013 | Cuthbert | A61B 5/1113 |
| | | | | 434/238 |
| 2014/0089399 | A1* | 3/2014 | Chun | G06Q 50/01 |
| | | | | 709/204 |
| 2014/0280529 | A1* | 9/2014 | Davis | H04L 67/535 |
| | | | | 709/204 |
| 2014/0335490 | A1* | 11/2014 | Baarman | A61B 5/1118 |
| | | | | 434/236 |
| 2015/0254563 | A1* | 9/2015 | Lynar | H04L 67/10 |
| | | | | 706/11 |
| 2016/0057565 | A1* | 2/2016 | Gold | H04W 4/023 |
| | | | | 455/41.1 |
| 2021/0041953 | A1* | 2/2021 | Poltorak | G16H 40/63 |
| 2021/0051400 | A1* | 2/2021 | Goran | G05B 15/02 |
| 2021/0165490 | A1* | 6/2021 | Aimone | G02C 11/10 |
| 2022/0036405 | A1* | 2/2022 | Publicover | H04W 4/21 |
| 2022/0093275 | A1* | 3/2022 | Sternberg | G16H 50/20 |
| 2022/0192580 | A1* | 6/2022 | Toth | A61B 5/14517 |

FOREIGN PATENT DOCUMENTS

| | | | | |
|---|---|---|---|---|
| CA | 3172928 | A1 * | 12/2021 | A24F 40/53 |
| EP | 3841967 | A1 * | 6/2021 | A61B 3/16 |
| IN | 201741024721 | A * | 1/2019 | |
| WO | WO-2018076619 | A1 * | 5/2018 | G16H 50/30 |

OTHER PUBLICATIONS

G. Acampora, D. J. Cook, P. Rashidi and A. V. Vasilakos, "A Survey on Ambient Intelligence in Healthcare," in Proceedings of the IEEE, vol. 101, No. 12, pp. 2470-2494, Dec. 2013, doi: 10.1109/JPROC.2013.2262913. (Year: 2013).*

Peternel, K.; Poganik, M.; Tavar, R.; Kos, A. A Presence-Based Context-Aware Chronic Stress Recognition System. Sensors 2012, 12, 15888-15906. https://doi.org/10.3390/s121115888 (Year: 2012).*

J. A. Healey and R. W. Picard, "Detecting stress during real-world driving tasks using physiological sensors," in IEEE Transactions on Intelligent Transportation Systems, vol. 6, No. 2, pp. 156-166, Jun. 2005 (Year: 2005).*

N. Lathia, V. Pejovic, K. K. Rachuri, C. Mascolo, M. Musolesi and P. J. Rentfrow, "Smartphones for Large-Scale Behavior Change Interventions," in IEEE Pervasive Computing, vol. 12, No. 3, pp. 66-73, Jul.-Sep. 2013 (Year: 2013).*

Matthews, M., Abdullah, S., Gay, G., & Choudhury, T. (Apr. 2014). Tracking mental well-being: Balancing rich sensing and patient needs. Computer, 47(4), 36, The Institute of Electrical and Electronics Engineers, Inc. (IEEE). (Apr. 2014). (Year: 2014).*

Fahim, M., Idris, M., Ali, R., Nugent, C., Kang, B., Huh, E., & Lee, S. (May 23, 2014). Athena: A personalized platform to promote an active lifestyle and wellbeing based on physical, mental and social health primitives. Sensors (Switzerland), 14(5), 9313-9329. (Year: 2014).*

Halcu, I., Nunes, D., Sgarciu, V., & Silva, J. S. (Nov. 30, 2015). New mechanisms for privacy in human-in-the-loop cyber-physical systems doi:http://dx.doi.org/10.1109/IDAACS.2015.7340770 (Year: 2015).*

Hansel, K., Wilde, N., Haddadi, H., & Alomainy, A. (Jan. 29, 2016). Wearable computing for health and fitness: Exploring the relationship between data and human behaviour. Ithaca: Cornell University Library, arXiv.org. (Year: 2016).*

* cited by examiner

INFERRING THE IMPACT ON A USER'S WELL-BEING OF BEING IN A CERTAIN LOCATION OR SITUATION OR WITH CERTAIN INDIVIDUALS

CROSS REFERENCE TO RELATED APPLICATION

This application is filed under 35 U.S.C. § 111 (a) and is based on and hereby claims priority under 35 U.S.C. $120 and § 365 (c) from International Application No. PCT/EP2019/081704, filed on Nov. 19, 2019, and published as WO 2020/104404 A1 on May 28, 2020, which in turn claims priority from European Application No. EP18382837.5, filed in the European Patent Office on Nov. 21, 2018. This application is a continuation-in-part of International Application No. PCT/EP2019/081704, which is a continuation of European Application No. EP18382837.5. International Application No. PCT/EP2019/081704 is pending as of the filing date of this application, and the United States is an elected state in International Application No. PCT/EP2019/081704. This application claims the benefit under 35 U.S.C. § 119 from European Application No. EP18382837.5. The disclosure of each of the foregoing documents is incorporated herein by reference.

TECHNICAL FIELD

This invention relates to an electronic device, method and system for inferring the impact of the context on user's well-being. More in particular, present invention identifies certain individuals, locations or situations that have an effect (positive or negative) on physical and mental state of a user. The invention can be used to provide recommendations for improving user's well-being (e.g., by increasing or decreasing time spent with specific individuals, at specific locations, or in specific situations).

BACKGROUND

U.S. Patent Publication 2014/0280529 discloses a method for determining contexts and determining associated emotion profiles using information received from multiple emotion-sensor-enabled electronic devices. Contexts are defined by a description of spatial and/or temporal components. Such contexts can be arbitrarily defined using semantically meaningful and absolute descriptions of times and locations. Emotion sensor data is associated with context data that describes the circumstances under which the data was determined. The emotion sensor data can include emotion sensor readings that are implicit indications of an emotion for the context. The sensor data can also include user reported data with explicit descriptors of an emotion for the context. The emotion sensor data can be filtered by context data according to a selected context. The filtered sensor data can then be analyzed to determine an emotion profile for the context that can be output to the user. In contrast to the present application, U.S. Pat. Pub. 2014/0280529 labels each context based on a person's emotions.

U.S. Patent Publication 2015/0254563 discloses a method for detecting an emotional stressor in a network of users that involves detecting changes in emotions of the users of the network, correlating individual ones of the changes in emotions based on a map that illustrates spatial, social, or temporal connections of the users, and inferring a cause of a change in emotion based on the correlating. This patent document focuses on the impact of social networks and on identifying "ill" connections among people and cyber-bullying. U.S. Pat. No. 7,967,731 discloses a method for motivating users to improve their wellness using complex event processing on sensor and user-interaction data of the users collected over time using inference and predictive models in order to deliver personalized interactions to motivate the users towards achieving their wellness goals.

U.S. Pat. No. 7,261,690 discloses an apparatus for detecting, monitoring and reporting that includes at least two sensors for generating data indicative of physiological parameters of the individual and/or data indicative of contextual parameters of the individual. A processor is coupled to the sensors and is adapted to generate analytical status data derived from the data indicative of physiological parameters, the data indicative of contextual parameters, and the analytical status data. A memory retrievably stores the data, and one of various ways of transmitting the data is provided.

U.S. Pat. No. 7,914,468 discloses a system for detecting non-verbal acoustic energy generated by a subject. The system includes a sensor mountable on or in a body region of the subject, the sensor being capable of sensing the non-verbal acoustic energy; and a processing unit being capable of processing the non-verbal acoustic energy sensed by the sensor and deriving an activity related signature therefrom, thereby enabling identification of a specific activity associated with the non-verbal acoustic energy.

U.S. Pat. No. 7,285,090 provides an apparatus that includes sensors for collecting data relating to an individual's physiological state and various contextual parameters and a data input and output device for enabling the individual to enter information and for displaying information to the individual. In particular, the apparatus can track caloric consumption and/or caloric expenditure of an individual.

The drivers of a user's emotional well-being are extremely complex, both for the user and for those who wish to understand it, measure it, and/or improve it. Previous research linked well-being to physical, social, purpose, belonging, and financial life components. Daily variations in emotional well-being can also depend on internal factors, such as cognitive processes, thoughts, energy levels, current perception of past/future, and external factors, such as surrounding people, locations, surroundings, and weather conditions.

New technologies are therefore needed for inferring the impact of the context on a user's well-being.

SUMMARY

An electronic device, a method and a system infer the impact of a user's surrounding context on the user's well-being. The electronic device includes a context scanner module that scans a certain area during a given period of time to detect position information of the electronic device of a user. The position information includes the geographical location of the electronic device and the proximity of the electronic device to other electronic devices of other users. The electronic device includes an emotion feedback module that detects an emotional response of the user during the given period of time by sensing physiological and physical signals of the user. The electronic device also includes a processing unit that determines the relationship between the detected position information and the detected emotional response and generates a report based on the determined relationship. The report provides information about how the determined position information and proximity information affects the user's well-being.

An electronic device includes a context scanner module, an emotion feedback module, a processing unit, a communication interface and a screen. The context scanner module is adapted to scan an area during a predetermined period of time to detect position information and proximity information of the electronic device of a user. The position information indicates a geographic location of the electronic device within the area. The proximity information indicates that the electronic device is in the proximity of a second electronic device of a second user. The emotion feedback module is adapted to detect an emotional response of the user during the predetermined period of time by sensing physiological and physical signals relating to the user. The processing unit is adapted to execute program instructions that implement an algorithm that determines the relationship between the detected position information, the detected proximity information and the detected emotional response. The processing unit is further adapted to generate a report based on the determined relationship. The report indicates how the user's presence in the geographic location and the user's proximity to the second user influences the user's well-being.

In one embodiment, the context scanner module and the emotion feedback module are implemented as software executing as a mobile app on the electronic device. The communication interface of the electronic device is adapted to transmit the generated report to a computing device such that the computing device uses the report to provide recommendations to the user in order to improve the user's well-being. The screen is adapted to display the report. In one embodiment, the computing device is part of the electronic device. In another embodiment, the computing device is remote from the electronic device, and the communication interface is adapted to transmit the detected position information, the detected proximity information, and the detected emotional response to the remote computing device. The physiological and physical signals concerning the user relate to characteristics such as heart rate, heart rate variability, breathing rate, blood pressure, ambient temperature, body temperature, electro-dermal activity, and ambient noise volume.

In another embodiment, a system includes a first electronic device of a first user, a second electronic device of a second user, and a processing unit in a remote computing device. The first electronic device includes a context scanner module and an emotion feedback module. The context scanner module is adapted to scan an area during a predetermined period of time to detect position information and proximity information of the first electronic device. The position information indicates a geographic location of the first electronic device within the area. The proximity information indicates that the first electronic device is in the proximity of the second electronic device. The emotion feedback module is adapted to detect an emotional response of the first user during the predetermined period of time by sensing physiological and physical signals relating to the first user.

The processing unit is adapted to execute program instructions that implement an algorithm that determines the relationship between the detected position information of the first user, the detected proximity information of the first user and the detected emotional response of the first user. The processing unit is also adapted to generate a report based on the determined relationship. The report indicates how the first user's presence in the geographic location and the first user's proximity to the second user influences the first user's well-being.

Other embodiments and advantages are described in the detailed description below. This summary does not purport to define the invention. The invention is defined by the claims.

BRIEF DESCRIPTION OF THE DRAWING

The accompanying drawings, where like numerals indicate like components, illustrate embodiments of the invention.

DETAILED DESCRIPTION

Figure 1:
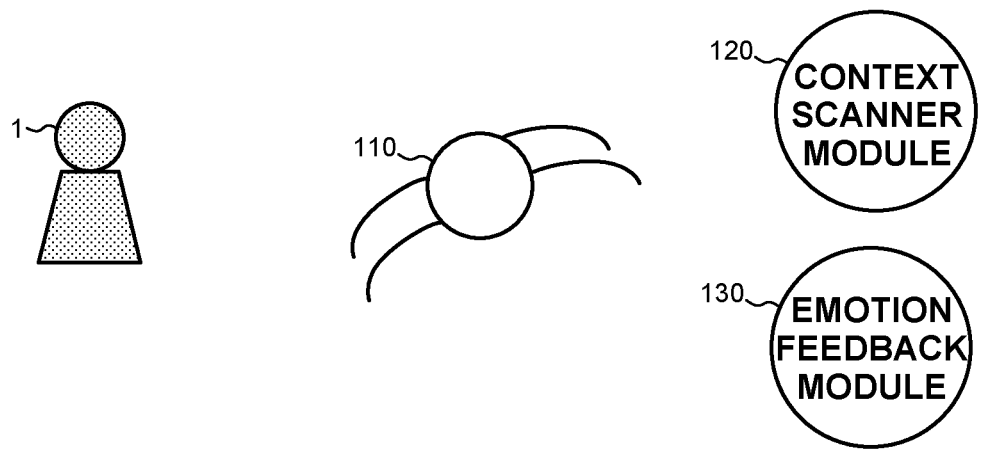
FIG. 1 illustrates an example of the proposed system, according to an embodiment.

Reference will now be made in detail to some embodiments of the invention, examples of which are illustrated in the accompanying drawings.

Present invention aims to isolate the impact of external factors on a user's well-being, and in particular to isolate the impact of the context, and to provide feedback about the relationship between different contexts and the user's well-being.

To that end, a first embodiment of the present invention is an electronic device that includes a context scanner module, an emotion feedback module, and a processing unit. The context scanner module scans a certain area during a given period of time to detect position information of the electronic device of a user. The emotion feedback module detects an emotional response of the user during the given period of time by sensing physiological and/or physical signals of the user. The processing unit executes an algorithm that establishes a relationship between the detected position information and the detected emotional response and further generates a report based on a result of the established relationship. The report provides information about how determined locations and/or users affect the user's well-being.

According to the present invention, the cited position information may include a geographical location of the electronic device within the certain area and/or the proximity of the electronic device to an electronic device of another user. The electronic device may include a handheld device, a wearable device or a Smartphone, among others.

In an embodiment, the electronic device also includes a communication interface that transmits the generated report to a remote (or separated) computing device, for example, a remote PC, server, etc. Thus, the remote computing device can use the received report to provide recommendations to the user in order to improve the user's well-being.

Alternatively, the electronic device may also include a screen or a speaker to output (i.e., display or describe) the generated report and recommendations to the user. In an embodiment, the context scanner module includes two different modules: a first module for detecting the proximity of the electronic device to the other electronic device, and a second module for detecting the geographical location of the electronic device. For example, the first module can include a Bluetooth sensor, a Wi-Fi sensor, a Zigbee based sensor and/or an audio signal analysis sensor, among others.

In yet another embodiment, the emotion feedback module includes a plurality of sensors, for instance, an electro-dermal activity sensor, a touch pressure sensor, a temperature sensor, a heart rate detector, a voice/facial analysis sensor, a user-input-based sensor, or a combination thereof.

In another embodiment of the present invention is a method for inferring the impact of a context on a user's well-being. The method involves scanning, by a context scanner module of a user's electronic device (e.g., a handheld device, a wearable device or a Smartphone) a certain area during a given period of time and detecting position information of the electronic device based on the scanning. In another step, the method involves detecting, by an emotion feedback module of the electronic device, during said given period of time, an emotional response of the user by sensing physiological and/or physical signals of the user. Finally, the relationship between the detected position information and the detected emotional response is established by a processing unit by executing an algorithm on both the information and the emotional response. A report is also generated based on a result of the established relationship, said report providing information about how the determined locations affect the user's well-being.

The algorithm may include a Pearson correlation, a linear regression analysis, a Bayesian statistical analysis and/or any other statistical method for exploring the relationship between variables.

In some embodiments, the method also includes the optional step of providing recommendations to the user based on the generated report in order to improve the user's well-being. By being able to determine how users (people) feel in certain situations, the method targets recommendations to the users in a more specific way, making the recommendations more relevant and accurate for the users.

In another embodiment, a system includes a processing unit and two or more electronic devices, such as a handheld device, a wearable device, a Smartphone, etc., each belonging to a different user and each including a context scanner module and an emotion feedback module.

The context scanner module of each electronic device is adapted to scan a certain geographical area during a given period of time to detect position information of the electronic device. The position information includes a geographical location of the electronic device within the certain area and/or the proximity of the electronic device to other electronic devices. In addition, the emotion feedback module of each electronic device is adapted to detect an emotional response of the user of the electronic device during the given period of time by sensing physiological and/or physical signals of the user.

The processing unit establishes a relationship between the detected position information and the detected emotional response by executing an algorithm, such as a Pearson correlation, a linear regression analysis, a Bayesian statistical analysis and/or any other statistical method for exploring the relationship between variables. The processing unit further generates a report based on a result of the established relationship. The report provides information about how the determined locations and/or the other detected persons affect the user's well-being.

In an embodiment, the processing unit is included or installed in each one of the electronic devices. Moreover, the electronic devices optionally include a communication interface to transmit the generated report to a remote or separate computing device (e.g., a PC or a server) so that the separate computing device can use the received report to provide recommendations to the user of each electronic device in order to improve their well-being. Likewise, the electronic devices also optionally include an electronic interface, such as a screen or a speaker, to output the generated report and recommendations to the user of each electronic device.

Alternatively, the processing unit is included in a remote or separated computing device (e.g., a PC or a server, among others). In that case, each one of the electronic devices further has a communication interface to transmit the detected position information and the detected emotional response to the remote computing device. The latter may use the received report to further provide recommendations to the user of each electronic device in order to improve their well-being. In some embodiments, the context scanner module includes two different modules. A first module detects the proximity of the electronic device to other electronic devices, and a second module detects the geographical location of the electronic device. Moreover, the emotion feedback module includes a plurality of sensors, such as an electro-dermal activity sensor, a touch pressure sensor, a temperature sensor, a heart rate detector, a voice/facial analysis sensor or a user input-based sensor, among others. The touch pressure sensor senses the pressure of the user's finger on the touchscreen of the user's electronic device.

Other embodiments of the invention also include software programs that perform the method steps and operations summarized above and disclosed in detail below. A computer program product is stored on a computer-readable medium and includes computer program instructions encoded thereon that when executed on a processor in a computer system cause the processor to perform the operations indicated herein as embodiments of the invention.

Figure 2:
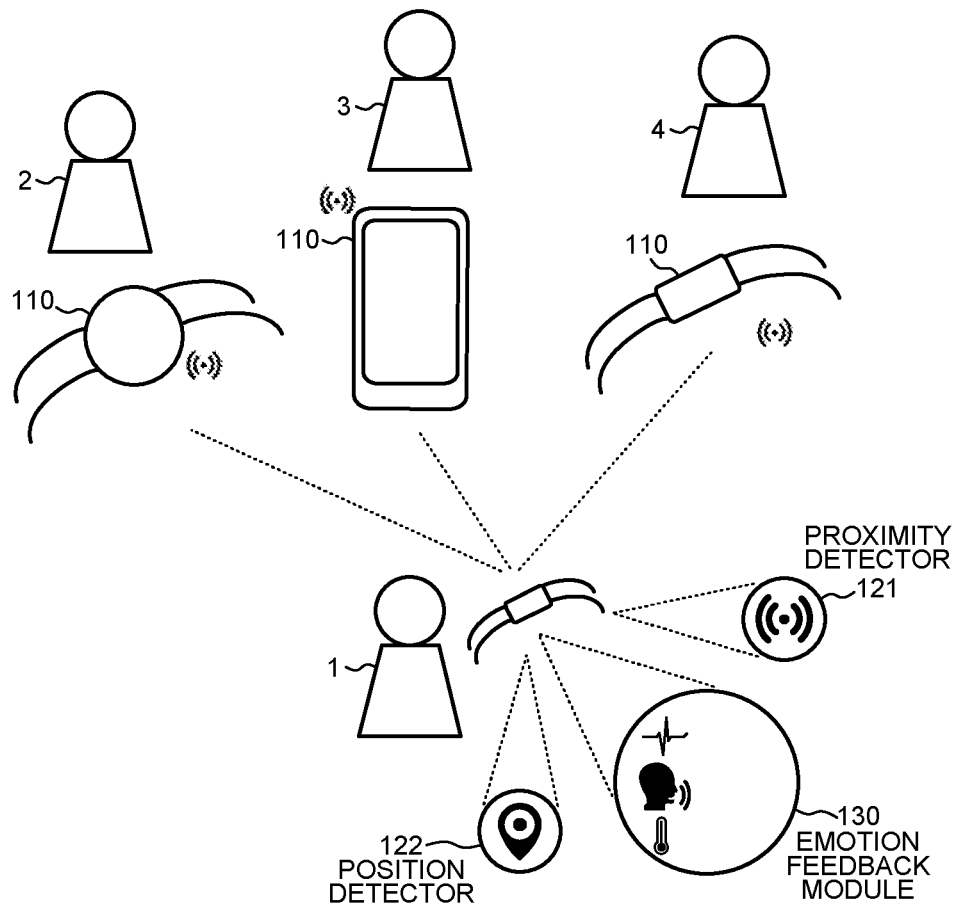
FIG. 2 illustrates another example of the proposed system, according to another embodiment.

The novel system includes an electronic device 110 (see FIG. 1) of a user 1, such as a smartphone, a handheld or a wearable device, a fitness tracker, an implant or tattoo, etc., that has a context scanner module 120 adapted to scan a certain geographical area during a given period of time to detect position information of the electronic device 110. The position information includes a geographical location of the electronic device 110 within the certain geographical area and/or the proximity of the electronic device 110 to other electronic devices 110 of other users 2-4 (see FIG. 2). In addition, the position information may also be based on additional information that may be available about the user 1 and/or on information regarding the surrounding conditions (such as weather, type of the environment, etc.). The information regarding the surrounding conditions can also include the user's electronic calendar of appointments, electronic grocery lists, and data from external resources, such as a weather database.

In particular, the context scanner module 120 includes two different submodules 121-122. The first submodule 121 is responsible of actively scanning the surroundings of the electronic device 110 to detect the proximity of the electronic device 110 to the other electronic devices 110. For example, the first submodule 121 can be a Bluetooth sensor, a Wi-Fi sensor, a Zigbee based sensor or be based on any radio, audio, video, location, optical based information that can be used to identify the immediate proximity of another user, such as an audio signal indicating the presence of human voice in an immediate surrounding (such as by applying MFCC algorithms), an audio signal to detect noise levels, face detection, or an audio signal analysis with voice recognition component (this is often delivered in an anonymized form with the voice features extracted to provide authentication but not the raw audio data or the content of the conversation). The second submodule 122 is a position detector responsible for actively scanning the location of the electronic device 110 and can be based on GPS, cell-tower identification or triangulation, Wi-Fi, combinations thereof or on an external API for localization, such as Google®.

In addition to the context scanner module 120, the electronic device 110 also includes an emotion feedback module 130 adapted to detect an emotional response of the user 1 during the given period of time by sensing physiological and/or physical signals of the user 1. That is, module 130 regularly samples signals that can be used to infer the emotional response of the user 1, including physiological or physical signals. For example, module 130 can sample: heart rate, PPG (photoplethysmography) or ECG (electrocardiography) signals for the detection of HRV (heart rate variability), EDA (Electro-Dermal Activity), blood pressure, breathing rate, ambient temperature, body temperature of the user, ambient noise volume, audio and/or video indications of voice and/or facial cues, among others.

In one embodiment, the context scanner module 120 and the emotion feedback module 130 are implemented as software executing as a mobile app on the electronic device 110. The electronic device 110 also includes a processing unit adapted to execute program instructions that implement an algorithm that performs a statistical analysis so as to establish a relationship between the detected position information and the detected emotional response. The algorithm is based on, for example, a Pearson correlation, a linear regression, a Bayesian statistical analysis, etc. The processing unit also generates a report based on a result of the established relationship. Thus, the report provides information about how the determined locations and/or other users in the proximity affect the user's well-being.

Figure 3:
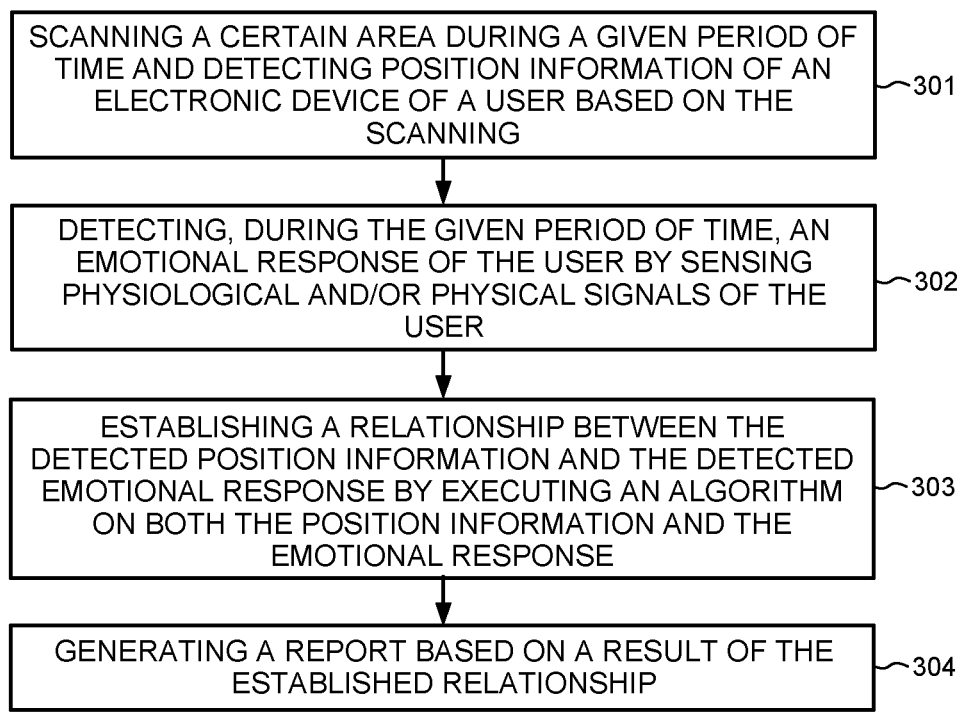
FIG. 3 is a flow chart illustrating an embodiment of a method for inferring the impact of the context on a user's well-being.

FIG. 3 is a flowchart of steps 301-304 of a method for inferring the impact of the context of proximity, location and situation on a user's well-being. In step 301, the geographical area surrounding electronic device 110 is scanned during a given period of time for other devices in the proximity and for the geographical location or position of electronic device 110. The position information of the electronic device 110 of the user 1 is detected based on the scanning. The position information includes at least the geographical location of the electronic device 110 within the given area and/or the proximity of the electronic device 110 to other electronic devices 110 of other users 2-4. In step 302, during the given period of time, an emotional response of the user 1 is detected by sensing physiological and/or physical signals of the user 1. In step 303, a relationship between the detected position information and the detected emotional response is established by executing an algorithm based on both the position information and the emotional response. Finally, in step 304, a report is generated based on the result of the established relationship. The report provides information about how the determined location and/or other users in the proximity affect the user's well-being.

In an embodiment, the method further provides recommendations to the user 1 based on the generated report in order to improve the user's well-being. Examples of the user recommendations include: "It is a good moment to suggest something motivational and focus on the big picture", "Reflect on positive things", "Time for a quick break", etc.

Various contexts are now disclosed in which the novel method can be applied.

Context 1: Influence of the proximity of various individuals to the user 1 on the user's well-being.

By continuously collecting information about the surroundings with the context scanner module 120, the identities of the people (users) who are in the vicinity of the user 1 at a certain time are determined. By analyzing the relationship between this proximity information and the emotional data collected by the emotion feedback module 130, the novel system determines how specific people affects the users' well-being, either positively or negatively. In addition to proximity information relating to how much time is spent with a particular person, the novel system also uses information relating to how much time the user has spent with a group of people, with a pet, performing a particular activity or sleeping.

Figure 4:
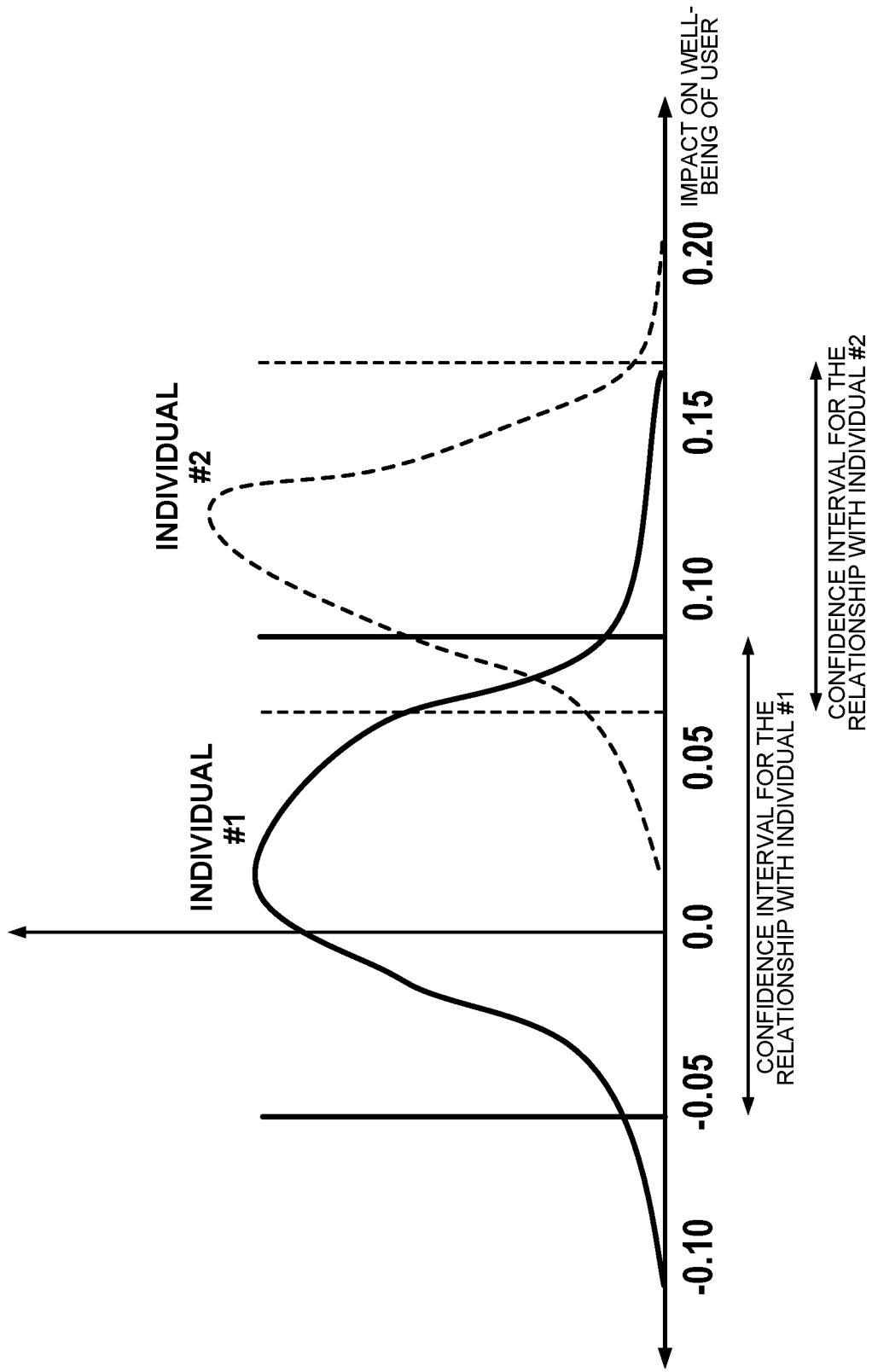
FIG. 4 is a graph showing an example of a Bayesian analysis of the relationship between a user's emotional response and the time duration spent with two different individuals.

FIG. 4 shows an example of a Bayesian analysis of the relationship between the user's emotional response and the time duration spent in the proximity of an individual #1. FIG. 4 also includes a second plot showing this relationship for a second individual #2. The plots represent the distribution of the impact that the automatically measured variable (time spent with individual #1 and individual #2) has on the other automatically measured variable (well-being index) of the user. In this example of applying Bayesian analysis, 95% of the distribution density must lie within the marked region (between vertical lines in FIG. 4). Therefore, in the case of individual #2, as the density lies fully on a positive side of the impact, it can be concluded that time spent with the individual #2 is related to the positive emotional response of the user, whereas no conclusions can be drawn about time spent with the individual #1 (i.e., the relationship is not statistically significant). In addition to the time spent with a specific individual, the novel method also analyzes the number of sessions spent with a specific individual, where a session refers to an uninterrupted chunk of time spent with an individual.

For example, in one embodiment, an electronic device 110, such as a wearable device, is assigned to a couple (each such user wears a wearable device 110) in a romantic relationship or in a friendship, who are interested in assessing the emotional impact on each other. Alternatively, the electronic devices 110 are used to provide the information to a therapist, marriage consultant, etc.

The novel system is used to help the relationship by providing a detailed analysis over time of the emotional response of each user in the relationship when the two users are together, with time stamps and location data, if available. For instance, it is possible that certain workday evenings cause conflicts due to built-up stress after work. The novel system provides a way to identify these situations and to direct therapy or the conversation in the right direction towards a solution to the negative emotional response. Alternatively, conflicts and friction arise during weekends and vacations because the couple's midweek interactions are limited due to work, hobbies and external commitments. In this case, the novel system is able to shed light on potentially problematic situations and to increase the possibility of finding the right solutions, or simply to show that the relationship is dysfunctional.

The novel system can also present the analysis or report in the form of a dashboard, graph and description sent to the user's email, delivered to the user's mobile phone, server, or the like. In another embodiment, the system is based on several electronic devices 110 distributed to users who belong to one or more teams within a company. In this embodiment, the company is interested in gaining a detailed insight in the well-being of its workforce and in receiving a unique report on how different teams are getting along among each other, or if the atmosphere within a specific team is negatively affecting the well-being of its members. In this scenario, each employee/user is given an electronic device 110. Although each electronic device 110 has its own unique ID, for privacy reasons the results may be delivered to the company in an aggregated form. In this way, when the users engage with each other, either on the factory floor or in the company's meeting rooms, detailed data on current well-being can easily be collected, aggregated and presented statistically to detect which working patterns cause a positive or negative impact on the well-being of employees.

Context 2: Influence of the geographical location of the user 1 on the user's well-being.

In this case, the context is labeled only according to the geographical location, either semantically (such as home, work, gym, bar, university, restaurant, etc.) or by a location identifier (loc-id1, loc-id2, loc-id3, . . . ). Where the location is labeled semantically, the description can be inferred using know algorithms that infer the label (e.g., "home" or "work") by sampling locations over time and assigning a semantic meaning by assuming typical habits of a user. For example, "home" is the location where a user spends a significant amount of time during nights, such as between 2 am and 4 am. "Work" is one of the most common locations in the user's distribution of time spent at each location, typically for 4-8 hours of most days. The novel system allows the user to manually label his or her locations. In case location identifiers are used, the invention samples locations over time while assigning unique identifiers to each uniquely detected location, while also allowing the user to manually label locations (e.g., home, supermarket, shopping center, gym, work, . . . ).

Figure 5:
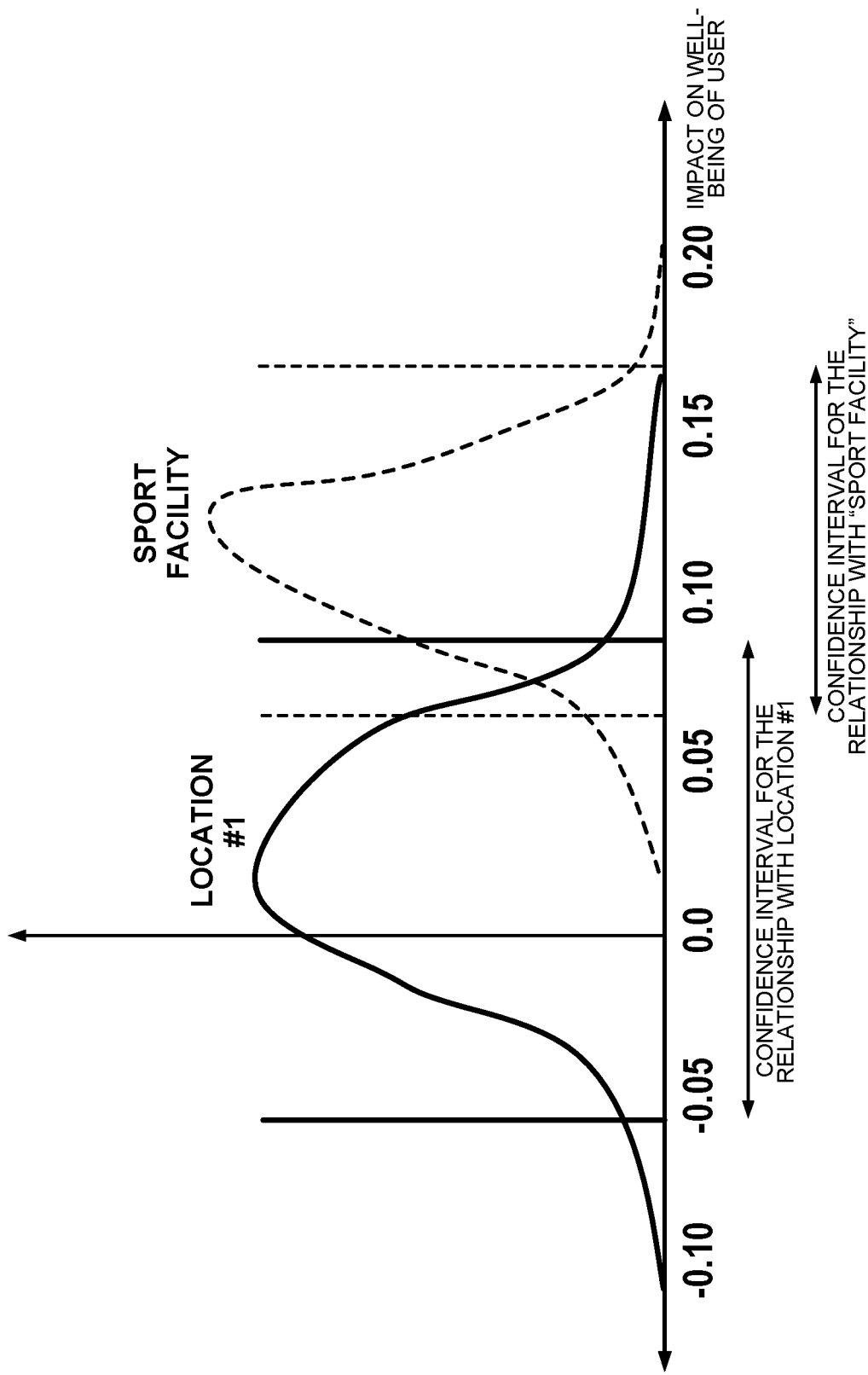
FIG. 5 is another graph showing the statistical analysis of the relationship between time spent at a known location (a sport facility) versus an unknown location ("location #1").

By continuously collecting information about the user's surroundings, the system determines where the user is currently located (by using GPS location, Google places, surrounding devices). By correlating this information with ongoing emotion-related signals, the system identifies locations that over time have an accumulated positive or negative impact on the user. The analysis of this use case is similar to that of Context 1, where the relationship is analyzed with respect to the duration spent at each location (or number of sessions spent at each location, where a session refers to an uninterrupted chunk of time spent at the location). Similarly to the use case illustrated in FIG. 4, FIG. 5 depicts the statistical analysis of the relationship between time spent at one known location (sport facility) with one unknown location ("location #1"). For the known location, there is a statistically significant positive relationship (e.g., the user generally enjoys being at that location), whereas for the unknown location no conclusion can be derived, as the correlation is not statistically significant. In this embodiment, the location need not be fixed; the transition between two locations can also be automatically or manually labeled (such as commuting).

Context 3: Influence on the user's well-being of the situations that the user 1 must deal with.

By combining location and user proximity with the emotional signals recorded by the electronic device 110, the system identifies situations that affect the user's well-being positively or negatively. This context is defined as a vector (timestamp, individual #1, individual #2, . . . , individual #N, locationID). The vector can be complemented with other contextual information that the system has the access to, such as weather or noise. Grouping users by proximity, geographical location and/or other contextual parameters enriches the analysis of context 1 or context 2 by providing more insights on the impact of different people, locations, or situations on the user's well-being. For instance, meeting a specific colleague (or more) outside of work settings can have a positive impact on the user's emotions versus negative emotions when the same user is in the vicinity of work. Two married people can have a positive emotional impact on each other when periods at home are frequently interrupted with periods outside of home. The situation can also be characterized by a noisy environment if the system has access to audio data and extracts the ambient noise volume in dB.

The system adds situations to the dashboard (or other communication channel) over time as vectors as the significant relationships between emotional response and situational vectors are reached. Over time, the system does not disclose the details of the analysis, which is similar to the type of information disclosed in Context 1 and Context 2.

In another embodiment, a mobile electronic device with a processing unit and an array of sensors is used to track motions and locations, sense other nearby devices, and to sense various biometric data about the user. The device determines the user's activity level, mood, habits, behavior, energy expenditure, caloric intake, and lifestyle. Once the behavior and lifestyle are determined, a mobile app on the device makes recommendations to the user to change his or her behavior to meet a target goal relating to physical health, stress level, time management, or personal relationship building.

The embodiments described above are to be understood as a few illustrative examples of the novel system and method, but the present invention is not limited thereto. It will be understood by those skilled in the art that various modifications, combinations and changes may be made to the embodiments without departing from the scope of the present invention. In particular, different part solutions in the different embodiments can be combined in other configurations, where technically possible. Various modifications, adaptations, and combinations of various features of the described embodiments can be practiced without departing from the scope of the invention as set forth in the claims.

What is claimed is:

1. An electronic device, comprising:
a context scanner module adapted to scan an area during a predetermined period of time to detect position information and proximity information of the electronic device of a user, wherein the position information indicates a geographic location of the electronic device within the scanned area, and wherein the proximity information indicates that the electronic device is in the proximity of a second electronic device of a second user;
an emotion feedback module adapted to detect an emotional response of the user during the predetermined period of time by sensing physiological and physical signals relating to the user; and
a processing unit adapted to execute program instructions that implement an algorithm that determines a relationship between the detected position information, the detected proximity information and the detected emotional response, wherein the processing unit is further adapted to generate a report based on the determined relationship, and wherein the generated report indicates how the user's presence in the geographic location and the user's proximity to the second user influence the user's well-being; and
wherein the processing unit uses the generated report to provide user-specific recommendations to the user including one or more behaviors that are selected, in view of the geographic location and the proximity of the second electronic device of the second user, to improve the user's well-being and to meet a target goal relating to physical health, stress level, time management, or personal relationship building.

2. The electronic device of claim 1, wherein the context scanner module includes a first submodule and a second submodule, wherein the first submodule is adapted to detect the proximity of the second electronic device of the second user to the electronic device of the user, and wherein the second submodule is adapted to determine the geographic location of the electronic device of the user.

3. The electronic device of claim 2, wherein the first submodule includes a sensor selected from the group consisting of: a Bluetooth sensor, a WiFi sensor, a Zigbee sensor and an audio signal sensor.

4. The electronic device of claim 1, wherein the emotion feedback module includes a sensor selected from the group consisting of: an electro-dermal activity sensor, a touch pressure sensor, a temperature sensor, a heart rate detector, an audio signal sensor, a facial analysis sensor, and a user input-based sensor.

5. The electronic device of claim 1, wherein the electronic device is selected from the group consisting of: a handheld device, a wearable device, and a smartphone.

6. The electronic device of claim 1, wherein the context scanner module and the emotion feedback module are implemented as software executing as a mobile app on the electronic device.

7. The electronic device of claim 1, wherein the physiological and physical signals relating to the user that are sensed relate to characteristics selected from the group consisting of: heart rate, heart rate variability, breathing rate, blood pressure, ambient temperature, body temperature, electro-dermal activity, and ambient noise volume.

8. A method comprising:
scanning an area during a predetermined period of time to detect position information and proximity information of an electronic device of a user, wherein the position information indicates a geographic location of the electronic device within the scanned area, and wherein the proximity information indicates that the electronic device is in the proximity of a second electronic device of a second user;
detecting an emotional response of the user during the predetermined period of time by sensing physiological and physical signals relating to the user;
determining a relationship between the detected position information, the detected proximity information and the detected emotional response; and
generating a report based on the determined relationship, wherein the generated report indicates how the user's presence in the geographic location and the user's proximity to the second user influence the user's well-being; and
using the generated report to provide user-specific recommendations to the user including one or more behaviors that are selected, in view of the geographic location and the proximity of the second electronic device of the second user, to improve the user's well-being and to meet a target goal relating to physical health, stress level, time management, or personal relationship building.

9. The method of claim 8, wherein the determining is performed by a processing unit in the electronic device that executes program instructions that implement an algorithm that determines the relationship.

10. The method of claim 9, wherein the algorithm includes a mathematical operation selected from the group consisting of: a Pearson correlation, a linear regression, and a Bayesian statistical analysis.

11. The method of claim 8, wherein the emotional response of the user is detected by an emotion feedback module implemented as software executing as a mobile app on the electronic device.

12. The method of claim 8, further comprising:
providing recommendations to the user based on the determined relationship in order to improve the user's well-being.

13. The method of claim 8, wherein the electronic device of the user is selected from the group consisting of: a handheld device, a wearable device, and a smartphone.

14. A system, comprising:
a first electronic device of a first user that includes a context scanner module and an emotion feedback module, wherein the context scanner module is adapted to scan an area during a predetermined period of time to detect position information and proximity information of the first electronic device, wherein the position information indicates a geographic location of the first electronic device within the scanned area, wherein the proximity information indicates that the first electronic device is in the proximity of a second electronic device of a second user, wherein the emotion feedback module is adapted to detect an emotional response of the first user during the predetermined period of time by sensing physiological and physical signals relating to the first user;
the second electronic device of the second user that includes a second context scanner module and a second emotion feedback module, wherein the second context scanner module is adapted to scan the area during the predetermined period of time to detect position information and proximity information of the second electronic device, wherein the position information indicates the geographic location of the second electronic device within the scanned area, wherein the proximity information indicates that the second electronic device is in the proximity of the first electronic device of the first user, and wherein the second emotion feedback module is adapted to detect the emotional response of the second user during the predetermined period of time by sensing physiological and physical signals relating to the second user; and
a processing unit in a remote computing device adapted to execute program instructions that implement an algorithm that determines a relationship between the detected position information of the first user, the detected proximity information of the first user and the detected emotional response of the first user, wherein the processing unit is further adapted to generate a report based on the determined relationship, and wherein the generated report indicates how the first user's presence in the geographic location and the first user's proximity to the second user influences the first user's well-being, wherein the remote computing device uses the generated report to provide user-specific recommendations to the first user including one or more behaviors that are selected to improve the first user's well-being in view of the geographic location and the proximity of the second electronic device of the second user.

15. The system of claim 14, wherein the first electronic device includes a communication interface adapted to transmit the detected position information of the first user, the detected proximity information of the first user and the detected emotional response of the first user to the remote computing device.

16. The system of claim 14, wherein the context scanner module of the first electronic device includes a first submodule and a second submodule, wherein the first submodule is adapted to detect the proximity of the second electronic device of the second user to the first electronic device, and wherein the second submodule is adapted to determine the geographic location of the first electronic device.

17. The system of claim 16, wherein the first submodule includes a sensor selected from the group consisting of: a Bluetooth sensor, a WiFi sensor, a Zigbee sensor and an audio signal sensor.

18. The system of claim 14, wherein the first electronic device of the first user is selected from the group consisting of: a handheld device, a wearable device, and a smartphone.

* * * * *